United States Patent
Di Colla Buchalla et al.

(10) Patent No.: US 12,462,257 B2
(45) Date of Patent: *Nov. 4, 2025

(54) PAYMENT SYSTEM USING CUSTOMER'S FINGERPRINTS

(71) Applicant: OVE, INC., San Francisco, CA (US)

(72) Inventors: Caio Di Colla Buchalla, San Francisco, CA (US); Anshul Bagai, Guatam Buddh Nagar (IN); Daniel Michael Cafiero, Estero, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,581

(22) Filed: Apr. 9, 2024

(65) Prior Publication Data

US 2024/0257133 A1    Aug. 1, 2024

Related U.S. Application Data

(60) Continuation of application No. 17/977,929, filed on Oct. 31, 2022, now Pat. No. 11,961,081, which is a
(Continued)

(30) Foreign Application Priority Data

Feb. 25, 2021    (IN) .............................. 202111007966

(51) Int. Cl.
  *G06Q 20/40*    (2012.01)
  *G06Q 20/20*    (2012.01)
  (Continued)

(52) U.S. Cl.
  CPC ....... *G06Q 20/40145* (2013.01); *G06Q 20/20* (2013.01); *G06Q 20/3226* (2013.01);
  (Continued)

(58) Field of Classification Search
  None
  See application file for complete search history.

(56) References Cited

U.S. PATENT DOCUMENTS

| 6,594,376 B2 | 7/2003 | Hoffman |
| 8,090,657 B2 | 1/2012 | Mitchell |

(Continued)

OTHER PUBLICATIONS

Press release dated Dec. 20, 2016 entitled "Fingerprint Cards' touch sensor FPC1025 featured in Samsung's new Notebook 9 PC line" by Fingerprint Cards AB, dba "fingerprints.com", of Gothenburg, Sweden, from https://www.fingerprints.com/2016/12/20/fingerprint-cards-touch-sensor-fpc1025-featured-in-samsungs-new-notebook-9-pc-line/.

(Continued)

*Primary Examiner* — Matthew S Gart
*Assistant Examiner* — Amit Patel

(57) ABSTRACT

Shoppers install a software app on a mobile device and create a user profile. The shopper scans a fingerprint using a fingerprint sensor. Scanned fingerprint data is wirelessly transmitted to the shopper's mobile device for re-transmission over the Internet for storage in a secured server. The shopper can add payment methods (credit cards, debit cards, etc.) to the user's profile. Participating merchants registered with the payment system provide a fingerprint sensor at the point of sale. A shopper transacts purchases at a merchant's location by placing a finger on the fingerprint sensor. Scanned fingerprint data is transmitted over the Internet to confirm the identity of the shopper, and to complete the transaction. A shopper makes purchases online using the installed software app. Participating merchants integrate APIs with existing e-commerce platforms, allowing merchants to charge and/or request access to user payment accounts.

8 Claims, 6 Drawing Sheets

Related U.S. Application Data division of application No. 17/226,390, filed on Apr. 9, 2021, now Pat. No. 11,514,454.

(51) Int. Cl.
| | |
|---|---|
| *G06Q 20/32* | (2012.01) |
| *G06V 40/12* | (2022.01) |
| *G06V 40/13* | (2022.01) |
| *H04W 4/80* | (2018.01) |
| *H04W 12/50* | (2021.01) |

(52) U.S. Cl.
CPC ....... *G06Q 20/325* (2013.01); *G06V 40/1306* (2022.01); *G06V 40/1365* (2022.01); *H04W 4/80* (2018.02); *H04W 12/50* (2021.01); *G06Q 2220/00* (2013.01)

(56) References Cited

U.S. PATENT DOCUMENTS

| | | |
|---|---|---|
| 2009/0144456 A1 | 6/2009 | Gelf |
| 2014/0074696 A1 | 3/2014 | Glaser |
| 2014/0279546 A1 | 9/2014 | Poole et al. |
| 2016/0043764 A1 | 2/2016 | Huang |
| 2019/0220866 A1 | 7/2019 | Starr et al. |

OTHER PUBLICATIONS

"Make Things Genius With FPC Access Sensor Series FPC1024 / FPC1025" Product Data Sheet, Jan. 2021, by Fingerprint Cards AB, dba "fingerprints.com", of Gothenburg, Sweden, from https://www.fingerprints.com/uploads/2021/01/fingerprints_productsheet_accesssensorseries_fpc1024_fpc1025-1.pdf.

PAYMENT SYSTEM USING CUSTOMER'S FINGERPRINTS

CROSS-REFERENCE TO RELATED PATENT APPLICATIONS

The present application is a continuation patent application based upon and claiming the benefit of the earlier filing date of co-pending divisional patent application Ser. No. 17/977,929, filed Oct. 31, 2022, soon-to-be-issued as U.S. Pat. No. 11,961,081, which is based upon, and claiming the benefit of the earlier filing date of U.S. non-provisional patent application Ser. No. 17/226,390, filed on Apr. 9, 2021, and entitled "Payment System Using Customer's Fingerprints", issued as U.S. Pat. No. 11,514,454, and which claims foreign priority to Indian patent application No. 202111007966 filed on Feb. 25, 2021, entitled "Payment System Using Customer's Fingerprints".

BACKGROUND OF THE INVENTION

Technical Field

The present invention relates to systems and methods for allowing a customer to purchase goods or services by using his or her fingerprints both to identify the customer and to authenticate and approve debiting of a customer's payment account.

State of the Art

When a customer visits a retail merchant store at an actual physical location, the merchant needs to ensure that the payment information (e.g., a credit card or debit card) presented by the customer actually belongs to the customer attempting to make the purchase. This is likewise true for the financial institution (e.g., bank, credit card processor or payment company) that manages the financial account selected by the customer to pay the merchant. These same considerations also apply when the customer is seeking to make a purchase online over the Internet. Fraudulent activity is not something new; unfortunately, dishonest people have been committing fraud for years by misappropriating either physical payment cards and/or personal and financial information to process illegal financial transactions in person and online. Identity theft and payment fraud cause serious economic injury. In 2018 alone, losses from payment card fraud throughout the world have been estimated to be over $24 Billion.

At points of a purchase in a physical location or on e-commerce platforms, merchants and financial institutions (payment companies, credit card processors/issuers and banks) cannot confirm with accuracy if the payment method and personal information used to complete the purchase belong to the same person. This is one of the main reasons why financial fraud and identity theft are so prevalent worldwide, especially in the United States. A large number of fraudulent financial 11 transactions are processed without any initial detection of fraud, and it is only after victims report such instances that merchants and financial institutions become aware of such fraud. Subsequent investigation of such circumstances, and the correction of customer accounts, requires significant time and expense, in addition to losses for non-payment for the fraudulently-obtained goods and services. Credit card companies and financial institutions have attempted to adopt secure protocols (PINs, passcodes, etc.), and yet the magnitude of fraudulent transactions continues to increase year over year, causing financial loss and extreme frustration for the victims and providers.

In most cases of financial fraud, purchase transactions are accepted at the time of the purchase, and are first discovered to be fraudulent only later when a victim becomes aware of such transaction and reports it to authorities. Significant resources are expended to investigate instances of fraud and to correct unauthorized charges to accounts of victims. Financial institutions have taken various measures to prevent fraudulent transactions from occurring, including the use of Personal Identification Numbers (PINs), passcodes, etc., but the extent of fraudulent transactions continues to increase each year, causing both financial loss and frustration for the victims and payment providers.

Consumers have several different ways to pay for a purchase, including credit cards, debit cards and smartphone electronic payment options. As the number of payment options increases, the problem of detecting and preventing financial fraud and identity theft becomes more complex.

Efforts have been made in the past to reduce instances of payment fraud and identity fraud to reduce resulting economic losses. For example, U.S. Pat. No. 6,594,376 to Hoffman discloses a method for tokenless authorization of commercial transactions between a buyer and a seller using a computer system. The buyer registers a PIN, a biometric sample (e.g., one or more fingerprint scans created by a fingerprint scanner), and one or more financial accounts with the computer system. The seller also registers the seller's financial account with the computer system. The seller proposes a commercial transaction to the buyer, and the buyer accepts the seller's proposal by adding to the proposed commercial transaction the buyer's personal authentication information, including the buyer's PIN and at least biometric sample from the buyer's person. The biometric sample and PIN are forwarded to the computer system for identifying the buyer. If the buyer is successfully identified, and if the buyer has sufficient economic resources, a registered financial account of the buyer is debited, and the registered financial account of the seller is credited, to transact payment. The commercial transaction is thereby conducted without the buyer having to use any smartcards or swipe cards.

Also, in U.S. Pat. No. 8,090,657 to Mitchell, a system is disclosed that authenticates financial transactions using a remote terminal that includes apparatus for sampling a unique biological identifier of a system user. The remote terminal may include a finger print reader used in conjunction with an electronic funds transfer point of sale terminal. This remote terminal may also include a card reader to read the magnetic strip on a credit or debit card, as well as a keypad enabling the customer to enter a PIN if required. A button may also be included for being pressed by a user to send entered data to a clearing house. A user may complete a transaction over the Internet, or at a merchant's remote terminal, by using a unique biological identifier, such as a fingerprint, in place of a credit card. The merchant's remote terminal may be connected by a telephone line and modem to a bank or credit card clearing house. The image is digitized and forwarded to a clearing house to identify the appropriate account for the required transaction to be processed.

However, each of such systems has been associated with other problems, including high cost, complexity, and difficulty in properly scanning a user's fingerprint. Accordingly, both purchasers and merchants still seek a simple, secure, and effective system and method for reliably and securely scanning a user's fingerprint, associating such fingerprint with a particular user account, and authenticating payment for a purchase by a user without the need for a physical credit card.

SUMMARY OF THE INVENTION

In one aspect, the present invention provides a fingerprint scanner including a housing and a sensor mounted on the housing adapted to receive a user's finger and to generate electrical signals representative of a user's fingerprint. If desired, the sensor mounted on the housing may be a capacitive-type sensor including an array of capacitors. A data processing unit is disposed within the housing and is coupled to the sensor for receiving the electrical signals for generating digital data corresponding to the user's fingerprint. A battery disposed within the housing provides electrical power to the other components therein. A wireless communication module disposed within the housing is coupled to the data processing unit for receiving the digital data corresponding to the user's fingerprint. The wireless communication module may, if desired, be of the Bluetooth® variety, for example, a Bluetooth® Low Energy (BLE) communication module, but might also be another type of wireless communication protocol. The wireless communication module is adapted to pair with a mobile device controlled by the user of the fingerprint scanner to securely exchange data between the fingerprint scanner unit and the mobile device controlled by the user. In one embodiment, the wireless communication module causes such data to be encrypted before communicating such data. In one embodiment, the battery is a rechargeable battery, the housing includes an electrical port mounted thereto for receiving an electrical plug of a battery charger, and the battery is selectively coupled to the electrical port for being charged thereby.

In another aspect, the present invention relates to a fingerprint scanner for use by a purchaser at a point of sale within a merchant's physical location. The fingerprint scanner includes a housing and a sensor mounted on the housing to receive a purchaser's finger and to generate electrical signals representative of a purchaser's fingerprint. A data processing unit disposed within the housing is coupled to the sensor for receiving the electrical signals and generates digital data, e.g., one or more hash codes, corresponding to the user's fingerprint. A battery is disposed within the housing for providing electrical power to the other components therein. A wireless communication module, which may be of the Bluetooth® variety but might also be another type of wireless communication protocol, is disposed within the housing and is coupled to the data processing unit for receiving the digital data corresponding to the user's fingerprint. The wireless communication module is adapted to pair with a second wireless communication module associated with a merchant point of sale terminal located at the merchant's physical location to securely exchange data between the fingerprint scanner and the merchant point of sale terminal.

In another aspect of the present invention, a system for processing transactions between a shopper and a merchant is provided wherein the shopper has a mobile communication device capable of installing and operating software instructions, and the merchant has a point of sale terminal, used for receiving payment for goods or services, and which is also capable of installing and operating software instructions. The system includes a fingerprint scanning unit having a sensor adapted to receive a shopper's finger and to generate a plurality of electrical signals representative of a shopper's fingerprint. The fingerprint scanning unit further includes a data processing unit coupled to the sensor to generate digital data corresponding to the shopper's fingerprint, as well as a wireless communication module coupled to the data processing unit for receiving the digital data corresponding to the shopper's fingerprint. The wireless communication module of the fingerprint scanning unit is adapted to communicate with the shopper's mobile communication device to securely exchange fingerprint data therewith. Likewise, the wireless communication module of the fingerprint scanning unit is also adapted to communicate with the merchant's point of sale terminal to securely exchange fingerprint data therewith to authorize the transaction with the identified shopper.

The aforementioned system also includes a web system administrator adapted to be coupled over a global network to the shopper's mobile communication device and to the merchant's point of sale terminal for downloading software instructions for execution on the shopper's mobile communication device and for execution on the merchant's point of sale terminal. The system also includes an API gateway adapted to be coupled over a global network to the shopper's mobile communication device and to the merchant's point of sale terminal. A first computer server is coupled to the API gateway and includes storage for storing authentic fingerprints of the shopper entered by the shopper using the fingerprint scanning unit. A second computer server is also coupled to the API gateway and includes storage for storing payment account information received from the shopper. When a shopper desires to enter into a transaction with a merchant, the shopper places his or her finger on the fingerprint scanning unit at the merchant's point of sale; the fingerprint data thereby received by the merchant's point of sale terminal from the fingerprint scanning unit, along with data characterizing the proposed transaction, is then sent over the API gateway to verify the identity of the purchaser and the sufficiency of funds in the shopper's payment account in order to complete the transaction.

In another aspect, the present invention makes use of an authenticated user profile with the ability to connect a user's payment cards and/or identification documents with the user's fingerprint 8 to virtually eliminate fraud in conjunction with the purchase of goods or services from merchants. This technology lends itself to practice both at a point of sale at a physical merchant location, as well as purchases made using an on-line platform. Users pay for goods and/or services through an authenticated user profile using their fingerprints. A user can sign up to participate by downloading 12 and installing a mobile app from an App Store. Each user is verified and authenticated through a photo issued-government identification document and a picture of the user taken as a "selfie", i.e., taken using the camera within the user's mobile device.

When a user signs up using the aforementioned mobile app, two secure IDs are generated. The first secure ID is shared with the user, and serves as a "secure token" used by the verification system (both with fingerprint-triggered purchases and online transactions). Once the user is registered, a user can add one or more payment methods (corresponding to one or more credit card and debit card accounts), cryptocurrency accounts (integrated with crypto currency exchanges).

A user can scan his or her fingerprints using the proprietary fingerprint scanner described herein, and the resulting fingerprint data is sent to the user's mobile device by a wireless communication protocol, e.g. via Bluetooth®. The fingerprint data and the secure user token are stored in a secured repository, e.g., in a secured intranet-based server. Fingerprint data is saved for future transactions and information permission matching along with the secure token of the user.

The payment authentication system and method described herein can be integrated with any third-party payment company, and the user's payment information is saved with them. When making purchases in-person at a participating merchant's brick-and-mortar store, or over the Internet through a participating merchant's online store (also known as "e-commerce"), the user authorizes each transaction using the authenticated profile previously created by the user via the mobile app. In this manner, the chance for fraudulent online activity is virtually eliminated.

In addition to storing payment method information and government-issued identification documents, the user can also securely save the user's personal documents, like healthcare insurance cards and other sensitive documents for easy access through the use of the user's fingerprints. Merchant sign up also goes through an authentication process. Upon completion of such merchant sign up process, the merchant has the option to integrate APIs associated with the described system with the merchant's e-commerce platform and/or to acquire the proprietary fingerprint scanner. The merchant may then use fingerprint scans obtained from customers at the point of sale to charge the customer's authenticated account matching such fingerprint and rapidly and reliably obtain payment.

BRIEF DESCRIPTION OF THE DRAWINGS

A more complete understanding of the present invention may be derived by referring to the detailed description and claims when considered in connection with the Figures, wherein:

DETAILED DESCRIPTION

Figure 1:
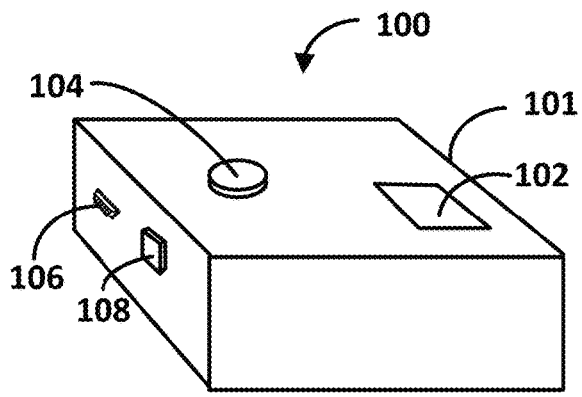
FIG. 1 is a perspective view of the exterior of a fingerprint sensor.

The fingerprint sensor unit 100 shown in FIG. 1 includes a protective housing 101. A sensor element 102 is supported on the exterior of housing 101, and may be either a capacitive-type sensor or an optical sensor. Also positioned on the exterior of housing 101 are a function key (which may include an LED indicator light if desired), a reset key 108, and a 2.0 Micro Type B micro-USB port 108 used for charging a rechargeable internal Lithium-ion battery within protective housing 101. Function key 104 can be used to "wake-up" the device from a "sleep mode" of operation, or alternatively, to place the device in "sleep mode" until needed later. Reset key 108, which may be recessed if desired, may be used to reset fingerprint sensor 100 (i.e., firmware re-boot) if it should become hung up. While not shown in FIG. 1, a multi-colored indicator light may also be provided on the exterior of protective housing 101 to indicate to a user that fingerprint sensor unit 100 is operating off of the internal Lithium-ion battery (battery mode), or to indicate that that fingerprint sensor unit 100 is operating off of the power adaptor (not shown) plugged into USB port 108. If desired, other multi-colored LED indicators (not shown) may be mounted on the exterior of protective housing 101 to indicate, for example, Active Mode v. Sleep Mode, Bluetooth® Connection Established, etc.

Sensor element 102 is preferably a capacitive-type sensor. Capacitance is the ability of a physical entity to hold electrical charge. A capacitive fingerprint sensor generates the fingerprint image by using an array containing many thousands of small capacitor plates. The array of plates makes up the equivalent of "pixels" of the image. Each such capacitive plate of the sensor acts as one plate of a parallel-plate capacitor. The inner dermal layer of the user's finger is electrically conductive and forms the opposing parallel plate of each such parallel plate capacitor; the nonconductive epidermal layer of the user's finger serves as the dielectric in between the two parallel plates. The user's finger has a distinctive pattern of ridges and valleys. When the user's finger is placed on sensor 102, faint electrical charges are created, building a pattern between the finger's ridges/valleys and the capacitive sensor plates. Using these faint electrical charges, the sensor measures a capacitance pattern across the surface of sensor 102. This pattern of measured charge values is then digitized by sensor logic (described further herein) and then sent to a microprocessor for analysis.

A capacitive-type sensor offers security advantages over similar optical sensors. For example, placing a high-quality photograph of the user's finger over a capacitive sensor will not "fool" the capacitive sensor into treating such photograph as being the equivalent of actual placement of the user's finger on the capacitive sensor. On the other hand, an optical-type sensor simply captures an optical image of the ridges and valleys of the user's finger, and a digital image is derived therefrom; applying a high-quality photograph of the user's finger over an optical sensor may, in some instances, deceive an optical sensor. Apart from being more secure (by requiring the physical presence of a human finger to generate the image), capacitive-type sensors are typically more compact than optical sensors, and easier to integrate into portable, compact devices. Capacitive-type sensors are also immune to the presence of bright background sunlight.

One such capacitive-type sensor which has been found to perform well in practicing embodiments of the present invention is the Touch Sensor Module commercially available from Fingerprint Cards AB, dba "fingerprints.com", of Gothenburg, Sweden, under Part Numbers FPC1025AM-CM06 (round shape) or FPC1025AM-CM03 (square shape). These Touch Sensor Modules use an active pixel matrix of at least 160 pixels×160 pixels, i.e., 160 rows and 160 columns of capacitive plates. This active pixel matrix is provided in an active sensing area that measures approximately 8.0 mm×8.0 mm. This sensor provides a spatial resolution of 508 dpi, and a pixel resolution of 256 grayscale levels (8-bit resolution). This capacitive sensor can operate with a typical supply voltage of between 1.8-3.3 volts.

Figure 2:
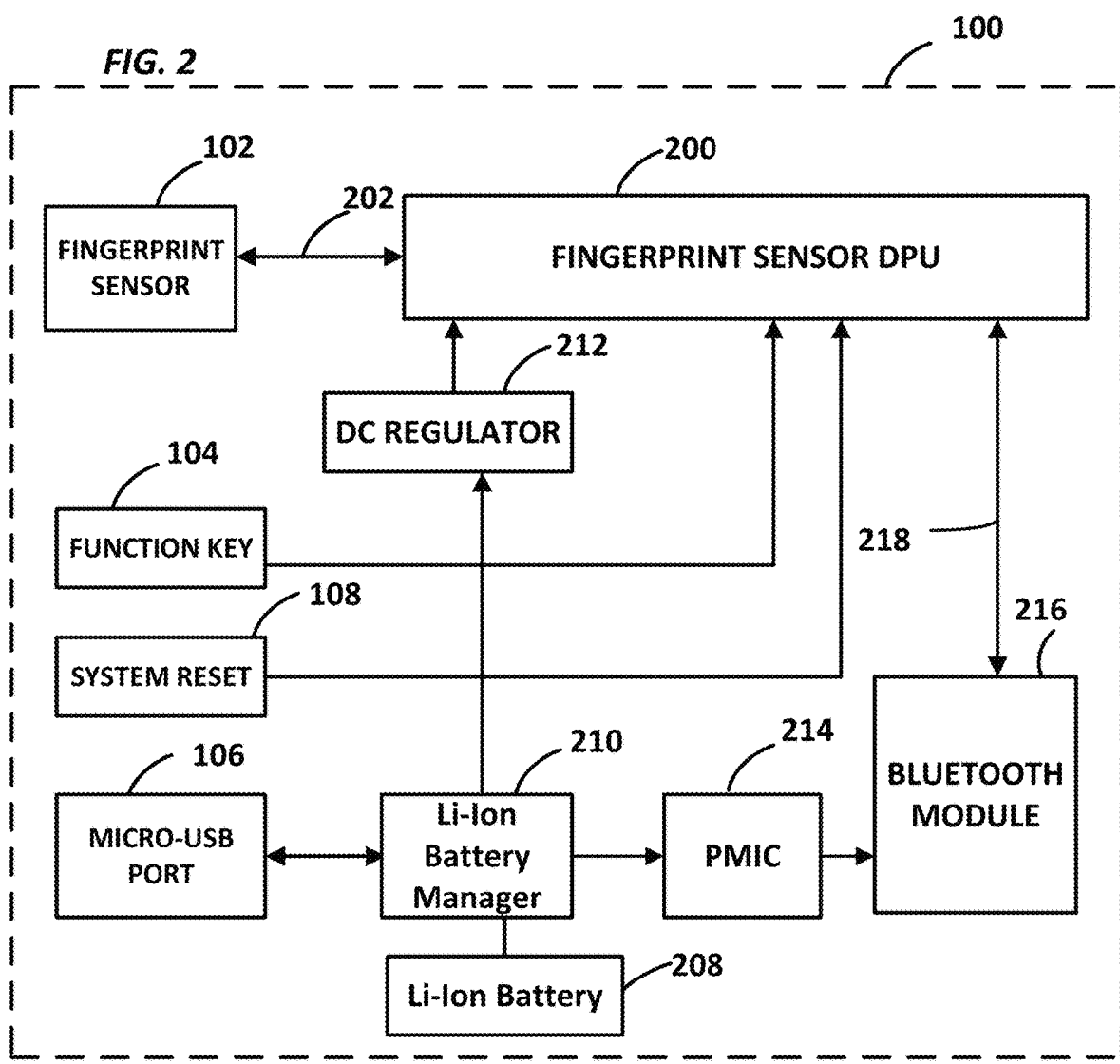
FIG. 2 is a block diagram showing the major electronic components used to form the fingerprint sensor shown in FIG. 1.

FIG. 2 is a block diagram the major components forming fingerprint sensor 100 in one embodiment. In FIG. 2, block 102 represents sensor 102 shown in FIG. 1 for receiving the user's finger to scan a fingerprint. Likewise, blocks 104, 106 and 108 represent the same elements identified in FIG. 1 using the same reference numbers. Also shown in FIG. 2 is a fingerprint sensor data processing unit, or "DPU", 200, which may be of the type commercially available from STMicroelectronics under Part. No. STM32L476RCT6. This DPU is an ultra-low-power microcontroller capable of operating from a 3.3 Volt power supply; it includes a high-speed Flash memory to rapidly store scanning data received from sensor 102. Communication bus 202 couples sensor 102 to DPU 200 and may be configured either as an asynchronous UART bus or a synchronous SPI bus. The primary function of DPU 200 is to rapidly read and store the data provided by sensor 102 to capture a fingerprint scan. DPU 200 is also programmed to control the operation of fingerprint sensor 100; while not separately shown, DPU 200 may be coupled with a Programmable Read-only Memory (EEPROM), such as Part No. AT24CS02-SSHM-T available from Microchip Technology, for storing programming instructions used by DPU 200. Function key 104 and system reset key 108 are coupled to input terminals of DPU 200 for signaling that they have been depressed.

Still referring to FIG. 2, fingerprint sensor 100 further includes Li-ion battery 208. Li-ion battery 208 represents a single-cell rechargeable Li-ion cell for storing electrical power of approximately 3.6 Volts D.C. The terminals of battery 208 are coupled to Li-ion Battery Manager module 210, which is also coupled to the micro-USB charging port 106. Battery Manager Module 210 may be of the type commercially available from SG Micro under Part No. SGM41524 and provides reverse-voltage protection and overvoltage protection up to 6 Volts. Battery Manager Module 210 may also include a conventional buck controller and hot-swap controller to support automatic charging of battery 208 when an appropriate power adaptor is plugged into micro-USB port 106. The maximum charging current applied to battery 208 is approximately 800 mA, and the maximum load current drawn from battery 208 during operation is approximately 200 mA. Battery Manager 210 preferably includes a proper heat dissipating surface to safely dissipate generated heat. Preferably, when battery 208 is fully-charged, it stores enough electrical power to perform approximately 100 finger scans. A battery having a rated capacity of 400 mAH (milli-Amp hours) has been found to be sufficient for such purpose.

Still referring to FIG. 2, Battery Manager block 210 is coupled to a power management integrated circuit (PMIC) module 214 which may be a linear voltage regulator of the type commercially available from ON Semiconductor under Part No. NCP186BMX330TAG. PMIC module 214 receives the approximately 3.6 power voltage provided by Battery Manager 210 and provides a well-regulated output voltage of 3.3V. This regulated 3.3 Volt supply is used to power Device Management Controller 204 and Bluetooth® Module 216. In FIG. 2, a separate DC regulator block 212 is shown coupling Battery Manager 210 to DPU 200 for providing a regulated power voltage to DPU 200. However, it is also possible to power DPU 200 from the 3.3 Volt supply provided by PMIC module 214, and thereby eliminate separate DC Regulator 212, if desired.

Fingerprint sensor unit 100 is configured as a "GATT" server, and supports the so-called "BLE 5" Bluetooth® Low Energy protocol. GATT is an acronym for the Generic Attribute Profile, and it defines the way that two Bluetooth® Low Energy devices transfer data back and forth using concepts called Services and Characteristics. It makes use of a generic data protocol called the Attribute Protocol (ATT), which is used to store Services, Characteristics and related data in a simple lookup table using 16-bit IDs for each entry in the table. The GATT configuration comes into play once a dedicated connection is established between two Bluetooth® devices. GATT connections are 8 exclusive in the sense that a Bluetooth® Low Energy peripheral can only be connected to one central 9 device (e.g., a user's smart phone) at a time. When a peripheral device, like fingerprint sensor unit 100, connects to a central device, it will stop advertising itself and other devices will no longer be able to see it or connect to it until the existing connection is broken.

Fingerprint sensor 100 is configured to provide a data transfer rate of approximately 256 Kilobytes per second (kbps). For each scan of a fingerprint, fingerprint sensor 100 captures between 5 KB to 25 KB of data. Scanning data captured by fingerprint sensor 100 is transmitted via Bluetooth® as fragmented sequences of data packets. Connected devices (e.g., Android or IOS-based App devices) that receive such scanning data via a Bluetooth® Serial Monitor/Terminal then assemble the serial data packets to restore the proper sequence of the digitally-encoded fingerprint scan.

Still referring to FIG. 2, Bluetooth® module 216 of fingerprint sensor 100 is an ultra-low power Bluetooth® Low Energy (BLE) module of the type commercially available from Fanstel Corp. under Part No. BT832A. Bluetooth® module 216 can operate from a 3.3 Volt supply and is configured as a Bluetooth® peripheral capable of communicating data with DPU 200 over communication bus 218 in an asynchronous fashion (e.g., using a UART) or in a synchronous fashion (e.g., using an SPI or I2C bus). It includes an onboard antenna for broadcasting and receiving radio frequencies within the Bluetooth® band, and as noted above, Bluetooth® module 216 is configured to connect to only one broadcaster at one time. For security reasons, Bluetooth® module 216 does not store Broadcaster Information, and after disconnecting from a paired device, all user-related information is erased from storage elements incorporated within Bluetooth® module 216. To further ensure security of communications, Bluetooth® module 216 supports 128-bit encryption, wherein a 128-bit key is used to encrypt and decrypt transmitted data. Preferably, Bluetooth® module 216 also incorporates Over-the-air (OTA) firmware update functionality to remotely update the firmware code therein.

After the user downloads and installs the user app on the user's mobile device, the user is prompted to enter identifying information about the user. This may include entry of the user's name, address, place of birth, date of birth, social security number, passport number, etc. The user is also prompted to upload one or more government-issued identification documents, such as a driver's license, passport, birth certificate, or the like. The information collected is then provided to a third-party identity authentication vendor, e.g. https://www.trulioo.com/, for verification. Upon being verified, a user is ready to match one or more of the user's fingerprints with user payment accounts.

Figure 3:
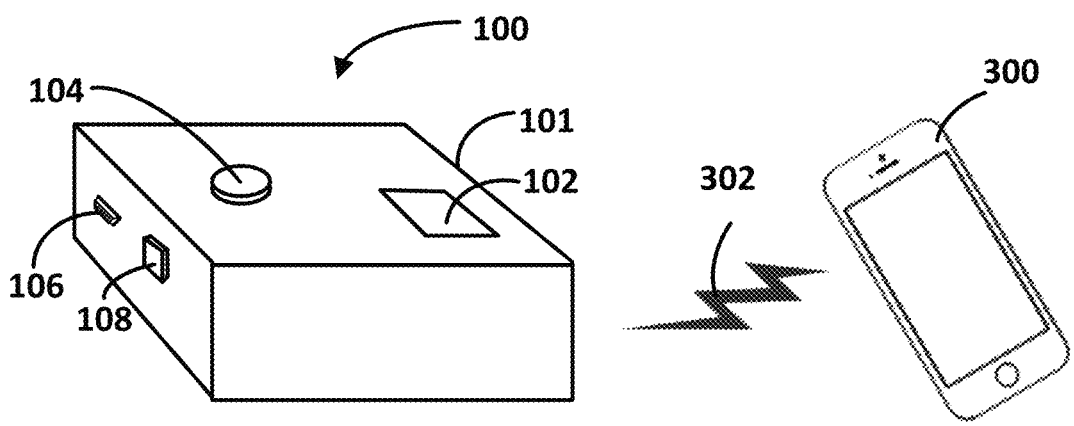
FIG. 3 is a perspective view of the fingerprint sensor of FIG. 1 communicating with a user's smartphone over a Bluetooth® wireless connection.

Initially, a customer/user desiring to make purchases using the present system, will first download the above-described mobile app on his or her smartphone and create a user profile. However, in order to enter one or more fingerprints for such user, the user will need to visit the physical location of a participating merchant who makes available the fingerprint sensor unit described above. In FIG. 3, fingerprint sensor 100 is shown at the merchant location communicating over Bluetooth® connection 302 with a like Bluetooth® transceiver included in the user's mobile device 300. After launching that app during the visit to the merchant store, the user can link to the merchant's fingerprint sensor unit over a Bluetooth® connection and then place one of the user's fingers on the fingerprint sensor area 102 to link the user's fingerprint to the user's profile. The user may repeat this process using different fingers; this feature allows a user to later associate particular payment accounts (credit card, debit card, PayPal, etc.) with specific fingers of the user. Eventually, when the cost of the fingerprint sensor units falls sufficiently, such fingerprint sensor units may ultimately be shipped directly to the user for use in the user's home.

Figure 4:
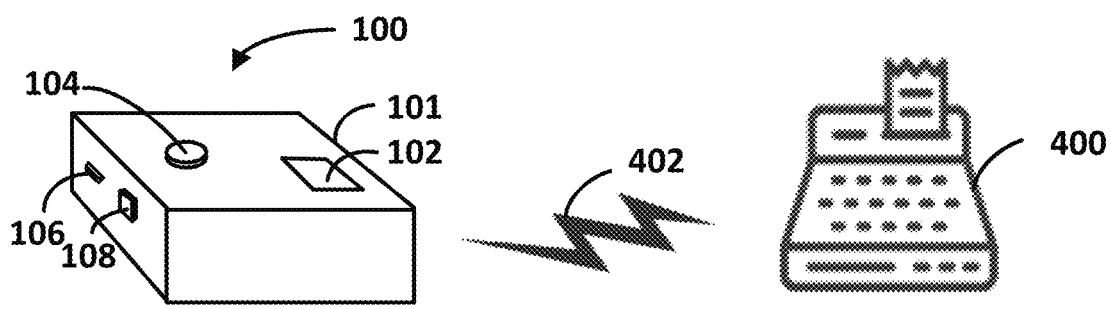
FIG. 4 is a perspective view of the fingerprint sensor of FIG. 1 communicating with a point-of-sale terminal over a Bluetooth® wireless connection at a merchant's location.

In FIG. 4, fingerprint sensor 100 is once again present at the merchant location. Also present is a point-of-sale terminal 400, as might be found at a check-out station at the merchant's store. A customer wishing to make a purchase at the check-out station is able to make payment for goods or services by simply placing the user's finger on sensor 102 of unit 100. In this regard, if the shopper has previously registered two or more different fingerprints, corresponding to two or more different payment accounts, then the customer/shopper would place a selected one of their fingers (corresponding to the payment account that the shopper wants to use) on the fingerprint scanning unit 100. Fingerprint sensor unit 100 transmits the scanning data (or hash code) over Bluetooth® connection 402 with a like Bluetooth® transceiver included in point-of-sale terminal 400. Software downloaded by the merchant then transmits the scanned fingerprint data over the Internet in a secure fashion to a payment clearinghouse, which debits the user account registered to such fingerprint, and credits the merchant account for the same amount. Thus, it is not necessary 8 for the shopper to present a credit card, debit card, or other form of physical payment device to the merchant in order to transact the purchase. While the shopper used the shopper's mobile device to register the shoppers fingerprint(s) initially, the shopper is not required to have the shopper's mobile device present at the time that the shopper is entering into the transaction with the merchant at the merchant's point of sale terminal in the merchant's physical location.

Figure 5:
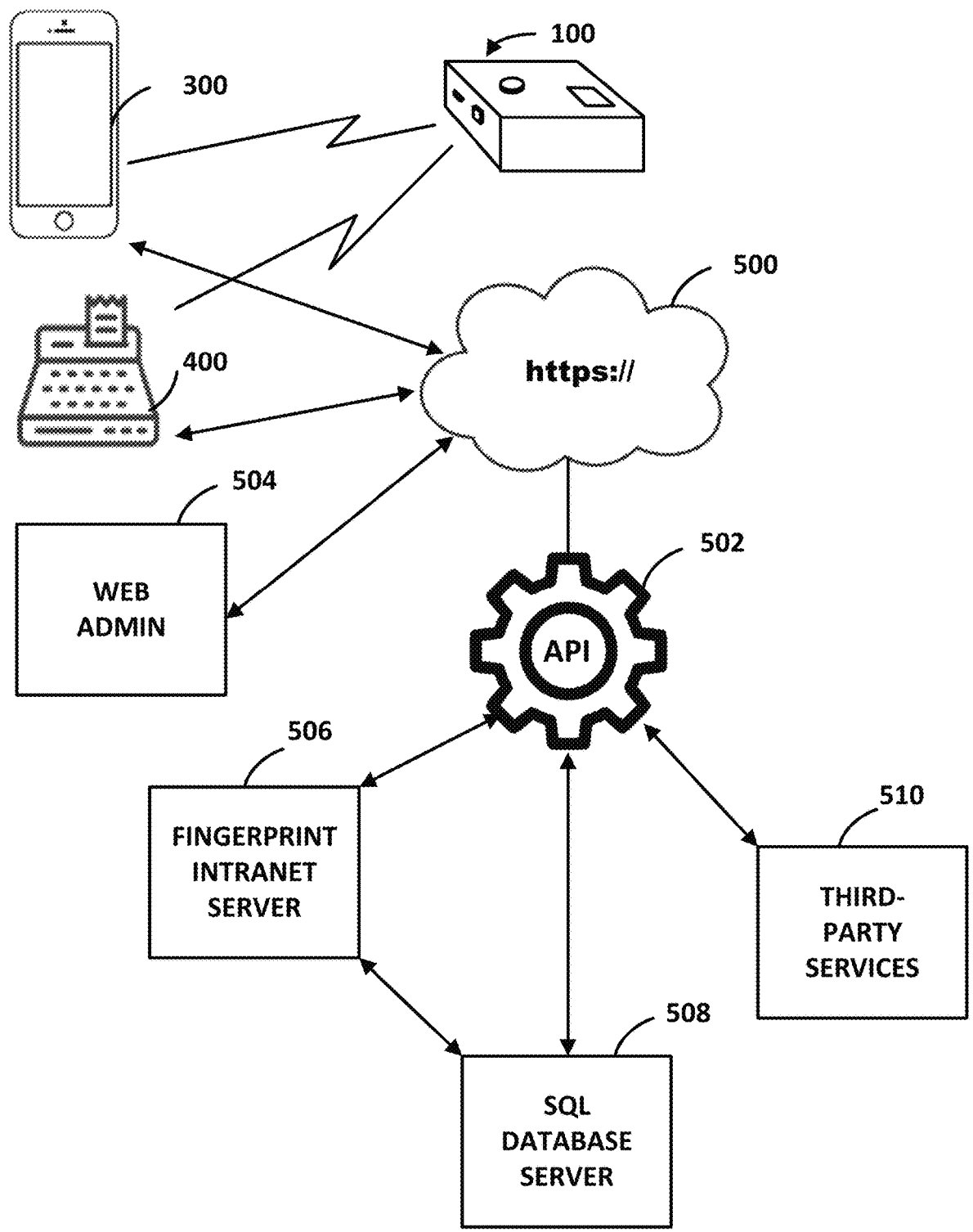
FIG. 5 is a block diagram illustrating the API architecture used to implement a system and method for making secure transactions.

Referring now to FIG. 5, fingerprint sensor unit 100, the user's smartphone 300, and the merchant's point-of-sale terminal 400 are again shown to emphasize that smartphone 300 and point-of-sale terminal 400 may both interface with fingerprint sensor unit 100 via a Bluetooth® connection for processing a scan of a user's fingerprint. In addition, both smartphone 300 and point-of-sale terminal 400 connect to the Internet 500, under the control of app software downloaded into smartphone 300, and installed in point-of-sale terminal 400, to securely communicate through API Gateway 502. Smartphone 300 would typically connect to the Internet 500 via a wireless connection over a Wi-Fi network. Point-of-sale terminal 400 may connect to the Internet in the same manner or over a hard-wired Ethernet network. A merchant desiring to participate in the current payment system may also sign-up using a merchant's smartphone, as opposed to using a merchant's point of sale terminal 400.

Web Admin block 504, which may be in the form of a computer server, is also connected to Internet 500, and may communicate with smartphone 300 and point-of-sale terminal 400. For example, a new user, or a new merchant, may access Web Admin block to request downloading of the required software app, and to process many of the administrative requests sent by users and merchants. Such communications are encrypted and secured by the app software installed on smartphone 300 and point-of-sale terminal 400. Web Admin block does not store highly confidential user profile data, but does allow the system administrator to provide technical support to actual and potential users and merchants.

Still referring to FIG. 5, API Gateway 502 serves as an interface between Internet 500 and fingerprint intranet server 506, SQL database server 508, and third-party service providers 510. An API is an application programming interface. APIs allow two software applications to interface with each other. More particularly, an API can be used to access a website or web-based software application. An API allows software applications to share data and functionality.

Fingerprint intranet server 506 is used to securely store fingerprint scans of users who scan one or more of their fingerprints during user registration with the payment system described herein. Server 506 is not available to the public and is managed by the system administrator. This fingerprint intranet server 506 is accessed each time a user attempts to make a purchase at a point of sale using fingerprint sensor unit 100 provided at the merchant point of sale. During each such transaction, a scan is obtained from a potential purchaser at the point of sale and compared to those scans already saved in fingerprint intranet server 506. If a match is detected, the identity of the potential purchaser is verified, and the particular fingerprint tendered by the potential purchaser may also be used to indicate which payment account should be used to pay for the purchase.

Secure SQL database server 508 is used to store confidential information associated with the user profile of each registered user, and to store processed transactions for each such user. User profile information would include such things as name, date of birth, place of birth, social security numbers, etc. It may also include payment account information which a user or a merchant has registered with the current payment system. Third party services block 510 in FIG. 5 represents servers of third-party vendors integrated with the payment system described herein. Such third-party vendors might include identity confirmation services, like Trulioo, and payment processing vendors, like Stripe, Inc. (https://stripe.com/). When a user requests a transaction at a merchant's point of sale, after authenticating the user's fingerprint tendered at the point of sale, corresponding user profile information stored in SQL database server 508 is provided through API gateway 502 to third-party server 510 (e.g., Stripe) to provide the user's profile information. Stripe, or another payment processor, can then proceed to debit the user's corresponding payment account, and credit the merchant's account to complete the transaction. Other third party vendors that can be integrated in this fashion might include Click Send (https://www.clicksend.com/us/) as for sending email messages and one-time passwords to users or merchants during the registration/verification process; and Google API for cross-checking postal address information entered by users and merchants during the registration process.

Figure 6:
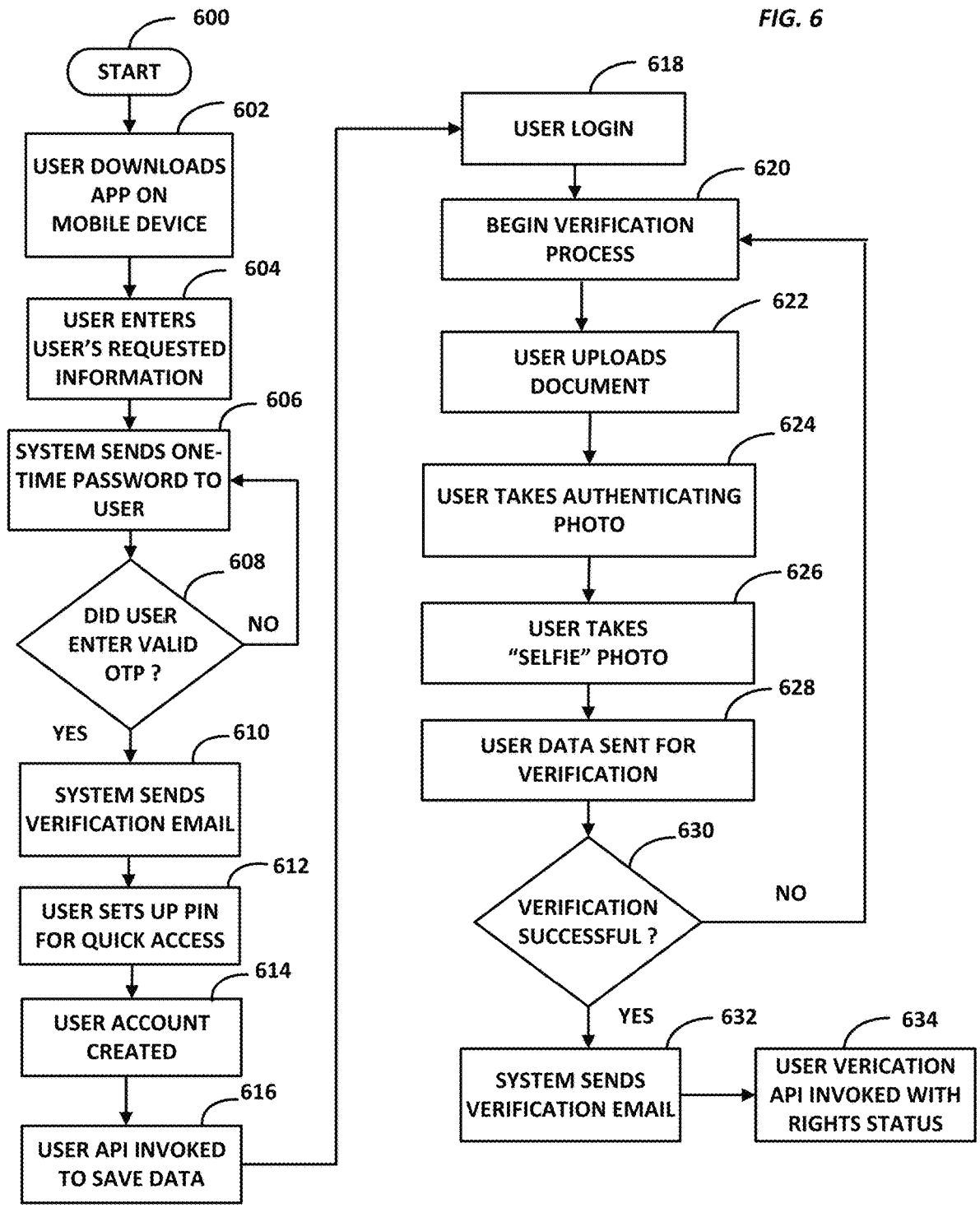
FIG. 6 is a flowchart illustrating the basic steps in opening and verifying an account for a new user.

FIG. 6 is a flowchart of the basic steps performed when a user registers to use the payment system described herein. Starting at step 600, a user wishing to make use of the current payment system proceeds to step 602 to visit an app store and to request the software app to be downloaded and installed on the user's mobile device (e.g., the user's smartphone 300). The user launches the installed app software, and at step 604, the user is prompted by the administration system to enter 12 requested information, such as the user's name, email address, mobile phone number, and a user-selected password. In response, the administrative system sends an authenticating email message or text message to the user providing a one-time password ("OTP") to the user, who must then enter the OTP and transmit it back to the system. At decision step 608, the administrative system determines whether the user has transmitted the correct OTP; if not, control passes back to block 606, and another attempt is made. If the correct OTP was transmitted by the user, then control flows to step 610, and the administrative system sends a verifying email to the user asking the user to select a security PIN (personal identification number) as an alternate form of identification. After receiving a PIN selected by the user, the administrative system creates the user's account at step 614, and a user API is invoked to save the data entered by the user in the SQL database server (508 in FIG. 5).

Still referring to FIG. 6, program flow proceeds to step 618, requesting the user to login; this may include prompting the user to enter their previously-selected user name and password or PIN. Flow then proceeds to step 620 to begin the process of verifying that the user is, in fact, the person that the user claims to be. This verification process can be performed initially by the system administrator but might also be under the control of a third-party vendor, like Trulioo, via the API gateway 502 and third-party server 510. As indicated at step 622, the user may be required to enter various information (e.g., the user's legal name, the user's date of birth and place of birth, the last four digits of the user's social security number), and the user may be required to upload one or more identification documents, such as a photo of the user's government-issued motor vehicle license or the user's government-issued passport. At step 624, the user may then be required to upload a photo of the user holding each of the documents uploaded in prior step 622, ensuring that each of the uploaded documents is actually in the physical possession of the user. Finally, the user may be required to take a "selfie" photo of the user, using the mobile device on which the software app has been installed, to confirm the identity of the user, and to confirm that the person holding the documents of step 624 is the same person now applying to be verified. At step 628, all of the data supplied by the user for purposes of verification is processed by the third-party verification service. At decision box 630, it is determined whether the verification process was completed successfully. If not, control is re-directed back to step 620, and the user is prompted to try again. However, if the verification process was successful, then the administrative system sends a confirming verification email message to the user at step 632, and the administrative system invokes a verification API to register the user as having verified rights status for future transactions.

While a separate flowchart is not included for the merchant registration/verification process, those skilled in the art will appreciate that a highly similar process may be performed to register and authenticate merchants who desire to authenticate user purchases at the point of sale, or online, and to receive payment from such users.

Up to this point in the user registration/verification process, the user has not yet made use of fingerprint sensor unit 100. However, those skilled in the art will understand that it is the same app software downloaded by the user in step 602 of FIG. 6 that allows a user's smartphone 300 to communicate with fingerprint sensor 100, as per FIGS. 3 and 5, at the time that such communications are required. Likewise, when a merchant downloads the app software to the merchant's point of sale terminal 400 (or to a merchant's mobile device) in order to register and verify the merchant for participation in the current payment system, the merchant app software downloaded and installed by the merchant is what allows the merchant's point of sale terminal 400 to communicate with fingerprint sensor 100, as per FIGS. 4 and 5, at the time that such communications are required.

Figure 7:
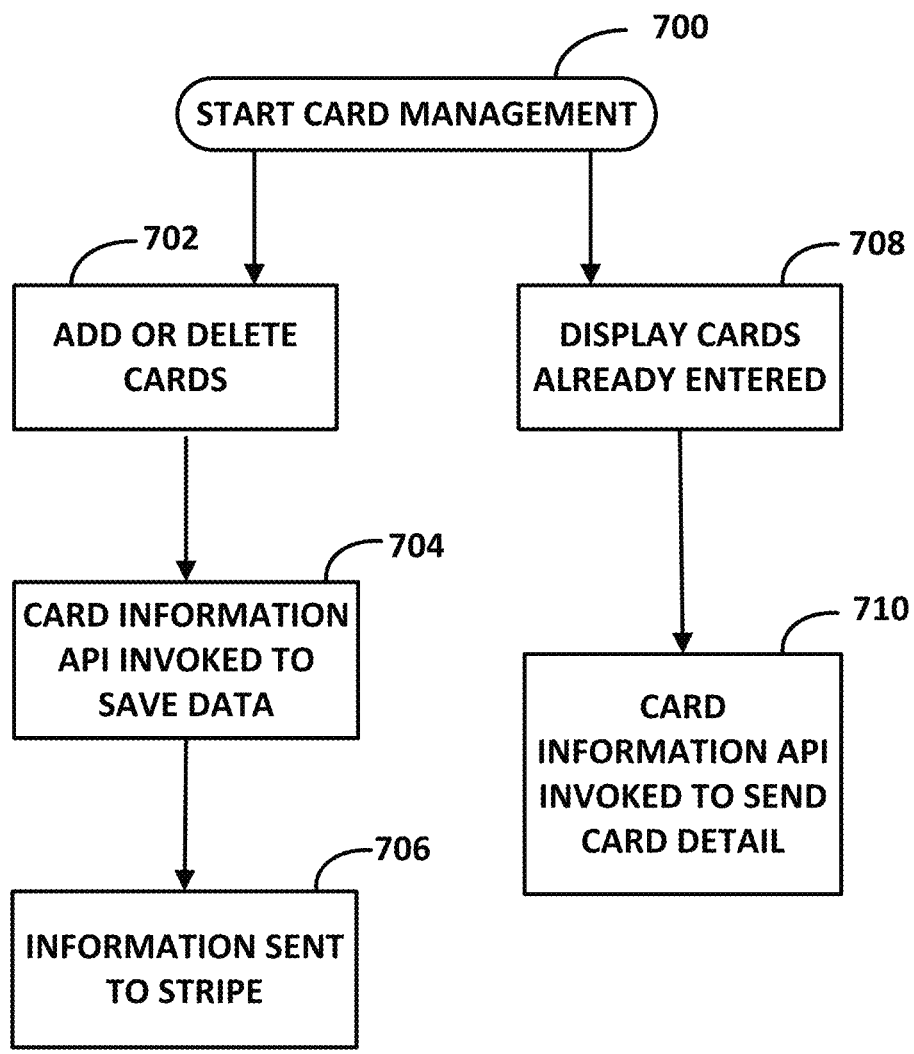
FIG. 7 is a flowchart illustrating steps performed by a user to manage payment cards.

Turning now to FIG. 7, a flowchart is shown illustrating steps for managing payment cards that may be used by a user to pay for desired purchases for goods or services. At step 700, a user indicates whether they wish to add or delete a payment card or payment method, or if they simply want to review a listing of payment accounts that have already been registered. If the user indicates that they wish to add or delete a payment account, control is passed to step 702 where the user is allowed to edit current payment accounts by either adding new account information or deleting old account information. Added account information might include the name on the payment card, the type of account, the full account number, the expiration date, and a CVV number or zip code for the account. An abbreviated summary of such information is saved in Web Admin block 504; for example, the type of payment card (Visa, Mastercard) and the last four digits of the specified account, simply for administrative purposes. A card information API is then invoked at step 704, and at step 706, all information entered by the user is passed through API gateway 502 to a third-party payment processor, such as Stripe, for storage of complete payment account information entered by the user. Returning to initial step 700, if the user simply wishes a summary listing of payment accounts currently registered, flow passes to block 708, and Web Admin block 504 sends information for display on the user's mobile device showing a summary listing (e.g., "Visa card ending in xx1234") of payment accounts currently registered with the system.

Figure 8:
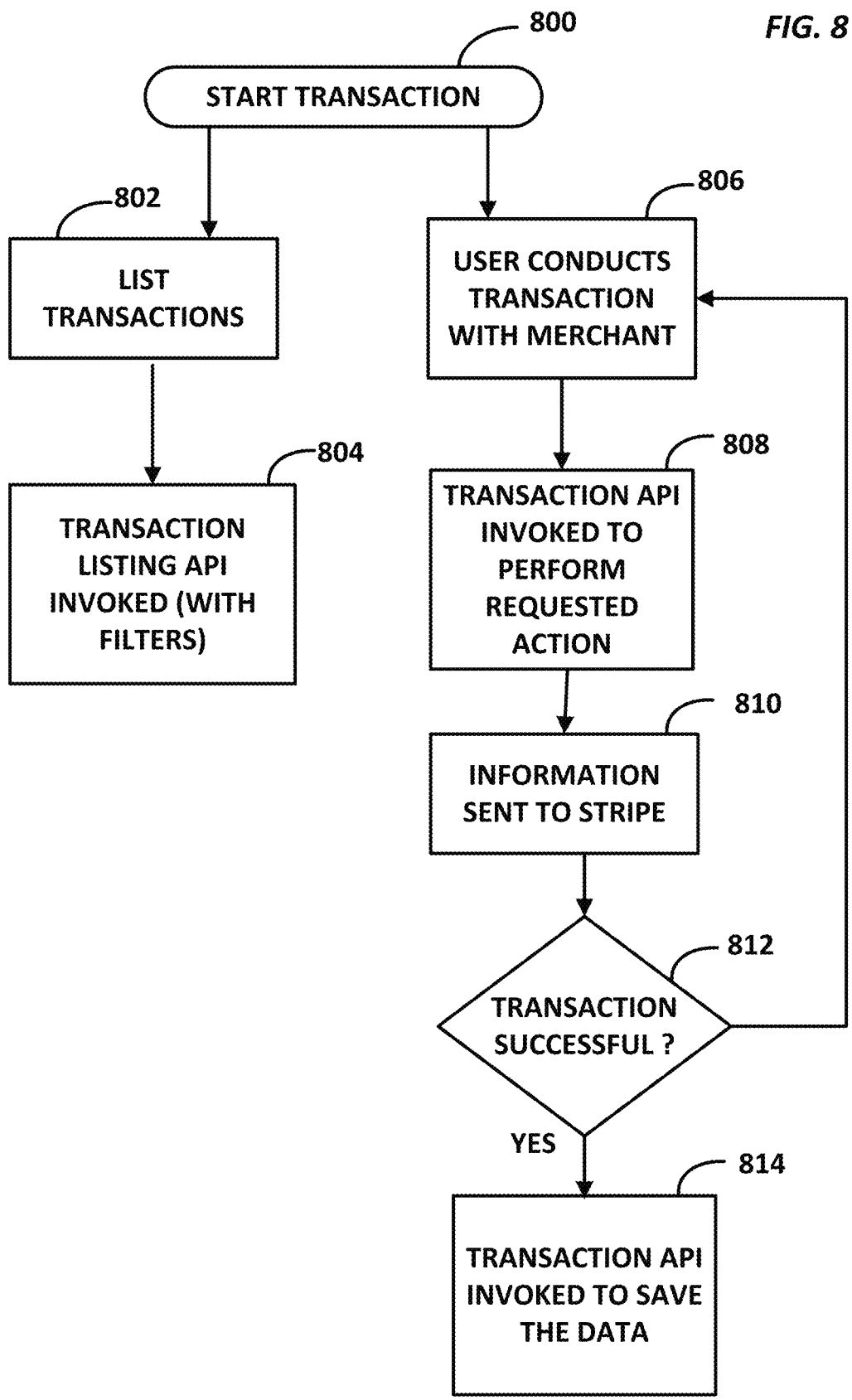
FIG. 8 is a flowchart illustrating steps performed to execute a secure transaction.

Now turning to FIG. 8, transaction-related steps are illustrated. Starting at step 800, if the user indicates that the user simply wants to review recent completed transactions, then flow passes to block 802. Web Admin block 504 processes such request by triggering invocation of a transaction listing API at step 804. This transaction listing API is passed by API gateway to the third-party payment processing vendor (e.g., Stripe) for preparing a listing of recent transactions which have been processed, and sending the list back to the user's mobile device for display. On the other hand, if the user is instead attempting to conduct a current transaction with a merchant, flow passes to step 806. This step might be triggered by the merchant's point of sale terminal 400 after a user makes use of the fingerprint sensor unit 100 provided by the merchant at the point of sale. Scanning of the user's fingerprint not only identifies the user/buyer, but may also indicate which of two or more payment accounts should be used, provided that the user has already registered two or more different fingerprints (corresponding to two or more different fingers) for use with different user payment accounts. Details concerning the proposed transaction, including the user identity, the merchant identity, the amount of the payment, and the payment account to be used, are forwarded to Web Admin block 504 for invoking a transaction API at step 808. The user may then receive a message displayed via the user's installed app requesting the user to enter the last four digits of the user's phone number, and the last four digits of the user's social security number. The information regarding the proposed transaction is then sent through the API gateway 502 to the third-party payment processor (e.g., Stripe) for processing at step 810. Assuming that the proposed transaction is successfully processed by the third-party payment processor, then the transaction API saves the transaction data at step 814. The user's payment account is debited, and the merchant's account is credited. On the other hand, if the proposed transaction is not approved by the third-party payment processor, then control is returned to step 806 for another try.

While the description above has described the use of the current payment system using credit cards, debit cards, and other electronic payment schemes (like Apply Pay, Pay Pal, etc.), those skilled 12 in the art will also understand that newer forms of currency (e.g., cryptocurrency) may also be used to pay for transactions. In this case, the present system can be integrated with third-party crypto-currency exchange providers in much the same way that third-party provider Stripe services charges to conventional credit card and debit card accounts.

Those skilled in the art will appreciate that an improved fingerprint scanner unit has been described which may communicate with both a user's mobile device and a merchant's point of sale terminal to uniquely identify a potential buyer in a highly-secure manner free of fraud. Those skilled in the art will also appreciate that a novel and secure method and system have been described for allowing shoppers and merchants to engage in secure transactions without the need for a shopper to physically present a payment card to the merchant at the point of sale. The embodiments specifically illustrated and/or described herein are provided merely to exemplify particular applications of the invention. These descriptions and drawings should not be considered in a limiting sense, as it is understood that the present invention is in no way limited to only the disclosed embodiments. It will be appreciated that various modifications or adaptations of the methods and or specific structures described herein may become apparent to those skilled in the art. All such modifications, adaptations, or variations are considered to be within the spirit and scope of the present invention, and within the scope of the appended claims.

The invention claimed is:

1. A fingerprint scanner unit comprising in combination:
    a housing;
    a sensor mounted on the housing adapted to receive a user's finger and configured to generate a plurality of electrical signals representative of a user's fingerprint;
    a data processing unit disposed within the housing and coupled to the sensor and receiving the plurality of electrical signals and configured to generate digital data corresponding to the user's fingerprint;
    a battery disposed within the housing providing electrical power to the data processing unit; and
    a wireless communication module disposed within the housing and coupled to the data processing unit and receiving the digital data corresponding to the user's fingerprint, the wireless communication module configured to communicate wirelessly with a receiving device to securely exchange digital data corresponding to the user's fingerprint between the fingerprint scanner unit and the receiving device.

2. The fingerprint scanner unit recited by claim 1 wherein the receiving device is a mobile device controlled by the user of the fingerprint scanner.

3. The fingerprint scanner unit recited by claim 1 wherein the receiving device is a merchant point of sale terminal located at a merchant's physical location.

4. The fingerprint scanner unit recited by claim 1 wherein the sensor is a capacitive-type sensor including an array of capacitors.

5. The fingerprint scanner unit recited by claim 1 wherein the wireless communication module used to exchange data with the receiving device causes such data to be encrypted before communicating such data.

6. The fingerprint scanner unit recited by claim 1 wherein the wireless communication module uses Bluetooth® wireless technology.

7. The fingerprint scanner unit recited by claim 6 wherein the wireless communication module is a Bluetooth® Low Energy (BLE) module.

8. The fingerprint scanner unit recited by claim 1 wherein:
    a) the battery is a rechargeable battery;
    b) the housing includes an electrical port mounted thereto configured to receive an electrical plug of a battery charger; and
    c) the battery is selectively coupled to the electrical port for being charged thereby.

* * * * *